J. EDGAR & A. BARDELL.
FRYING-PAN.

No. 184,282. Patented Nov. 14, 1876.

Witnesses.
Otto Hufeland
Robt. E. Miller

Inventors
James Edgar
Alfred Bardell
by
Van Santvoord & Hauff
their attorneys

UNITED STATES PATENT OFFICE.

JAMES EDGAR, OF NEW YORK, AND ALFRED BARDELL, OF BROOKLYN, N. Y.

IMPROVEMENT IN FRYING-PANS.

Specification forming part of Letters Patent No. 184,282, dated November 14, 1876; application filed September 14, 1876.

*To all whom it may concern:*

Be it known that we, JAMES EDGAR, of the city, county, and State of New York, and ALFRED BARDELL, of Brooklyn, in the county of Kings and State of New York, have invented a new and useful Improvement in Frying-Pans, which improvement is fully set forth in the following specification, reference being had to the accompanying drawing, in which—

Figure 1:
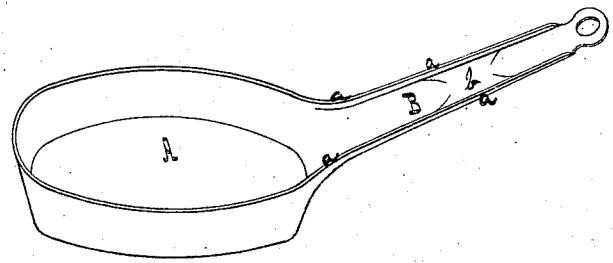
Figure 2:
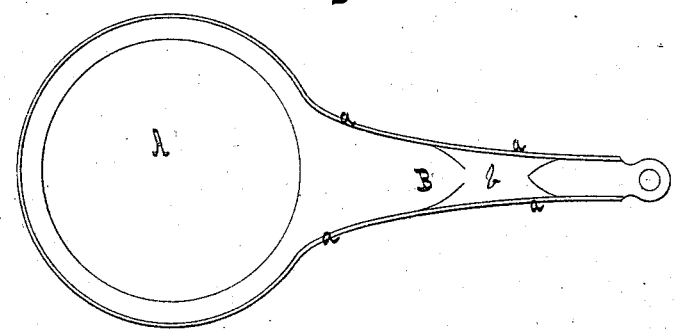
Figure 3:
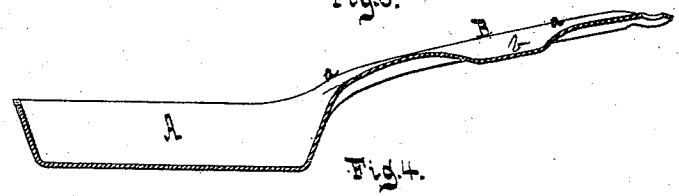
Figure 4:
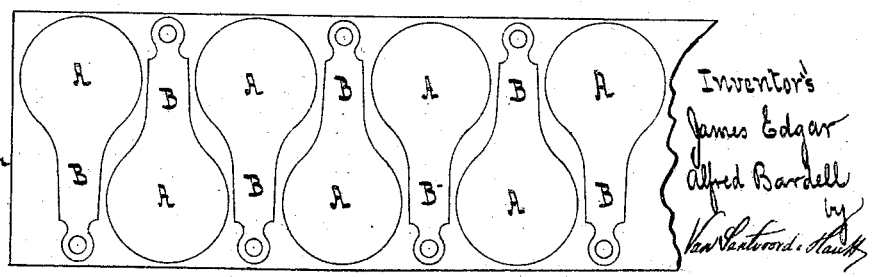

Figure 1 represents a perspective view. Fig. 2 is a plan or top view. Fig. 3 is a longitudinal vertical section. Fig. 4 is a plan showing the blank for our pan.

Similar letters indicate corresponding parts.

This invention consists in a frying-pan which, together with its handle, is stamped out of one piece of sheet metal, the handle being strengthened at its junction with the bowl by vertical flanges, so that a frying-pan is obtained which is light, durable, easily cleaned, and not liable to leak.

In the drawing, the letter A designates the bowl of our frying-pan, which, together with its handle B, is stamped out of one and the same piece of sheet metal. By these means a frying-pan is obtained the interior and exterior surfaces of which are perfectly smooth, (there being no rivets required for securing the handle,) so that the same can be easily cleaned. If the handle is secured to the bowl by means of rivets, the rivets sometimes do not fit their holes perfectly tight, so that, particularly when the pan is heated, melted fat contained therein passes through said rivet-holes, and thereby the fat is caused to ignite. Besides this, impurities are liable to lodge between the handle and the bowl at the point of their junction, and it is exceedingly difficult to keep a frying-pan of this description clean.

In order to impart to the handle of our pan the requisite strength, we provide the same with vertical flanges $a\ a$, which extend from the top edge of the bowl along the edges of the handle, and a depression, $b$, at a point intermediate between the bowl and extremity of the handle, said depression not only assisting to impart strength to the handle but giving it the requisite body or thickness to be readily grasped and held in the hand. It will be seen that in order to break the handle these vertical flanges have to be broken edgewise, and it will take considerable force to accomplish this result. It must be remarked particularly that by means of these vertical flanges the junction between the bowl and the handle is rendered strong, and capable of sustaining such weights as may be placed in the pan without being liable to bend or break.

In order to cut out the blanks of our frying-pan to the best advantage, we make the length of the handle equal to the circular portion of the blank, and we mark off the blanks on the sheet in the manner shown in Fig. 4. By examining this figure it will be seen that the only waste which occurs is at the ends of the sheet, whereas if the blanks for the bowls and those for the handles are cut out separate, considerable waste occurs between the adjoining circles of the blanks for the bowls, and the handles have to be cut out besides, and in addition thereto more stock is required for such handles, since they have to be made long enough to form flanges, which are afterward riveted to the bowls. In the manufacture of our pans the labor for riveting is saved. Our frying-pans can be easily packed up in a small compass, since they "nest" to perfection, which is not the case with frying-pans in which the handles are riveted to the bowls.

By the above construction it will be seen that a frying-pan with its handle is produced as an integral from a single piece of metal, the handle being formed with vertical flanges extending from the bowl to the extremity of the handle, and with a depression at a point intermediate between the bowl and extremity of said handle, so that requisite strength and sufficient body of material is present at the bend of the handle and the bowl to insure a strong and durable article.

What we claim as new, and desire to secure by Letters Patent, is—

1. As a new article of manufacture, a frying-pan in which the bowl and handle are stamped out of one and the same piece of sheet metal, substantially as and for the purposes specified.

2. The blank for a frying-pan constructed with the handle equal in length to the diameter of the bowl, for the purpose of saving material or stock, for the manufacture of the pan and handle in one piece, substantially as herein shown and described.

3. The frying-pan constructed as herein shown and described, the bowl and the handle made as an integral from one piece of metal, the handle being provided with vertical flanges $a\ a$, and with the depressions $b$ intermediate between the bowl and extremity of the handle, substantially as and for the purpose specified.

In testimony that we claim the fo ｣e we have hereunto set our hands and seals this 11th day of September, 1876.

JAMES EDGAR. [L. S.]
  ALFRED BARDELL. [L. S.]

Witnesses:
 W. HAUFF,
 E. F. KASTENHUBER.